Figure 1:
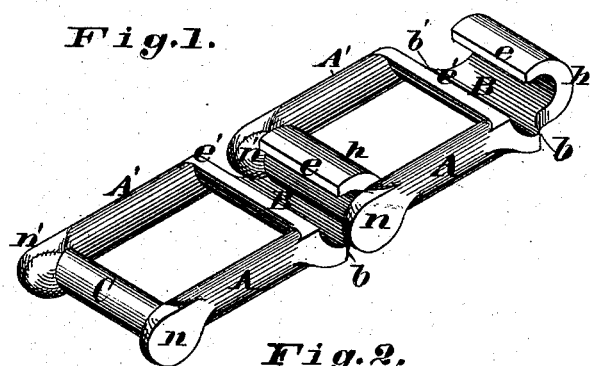

(No Model.)

N. B. FASSETT.
Drive Chain.

No. 237,967. Patented Feb. 22, 1881.

Attest:
Charles Pickles
L. D. Moody

Inventor:
Nelson B. Fassett

UNITED STATES PATENT OFFICE.

NELSON B. FASSETT, OF ST. LOUIS, MISSOURI.

DRIVE-CHAIN.

SPECIFICATION forming part of Letters Patent No. 237,967, dated February 22, 1881.

Application filed December 14, 1880. (No model.)

*To all whom it may concern:*

Be it known that I, NELSON B. FASSETT, of St. Louis, Missouri, have invented new and useful Improvements in Drive-Chains, of which the following is a full, clear, and exact description, reference being had to the annexed drawings, making part of this specification, the same parts being designated by the same letters of reference in the drawings.

My invention relates to those links in which cams are employed in connection with shoulders for keeping the cross-bar in place.

My improvement consists in a link formed with longitudinal bars, cams in line therewith and convex on their inner faces, a cross-bar with which the hook engages between the said cams, a hook-base having a single central broad hook provided with an extension and shoulders curved outwardly from the hook, the said cam-faces being adapted to play on the curved shoulders to slide the cross-bar on the shank into place under the hook, so as to be covered by the hook-extension, as hereinafter set forth.

Figure 2:
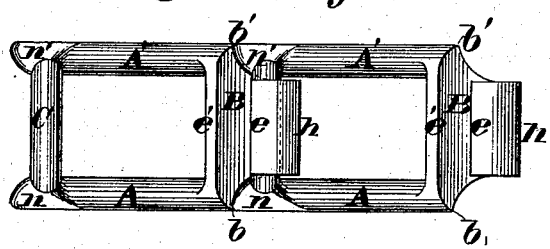
Figure 4:
Figure 3:
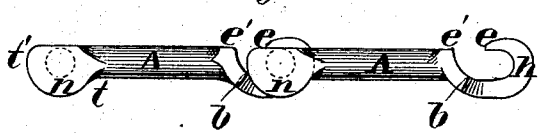
Figure 5:
Figure 6:
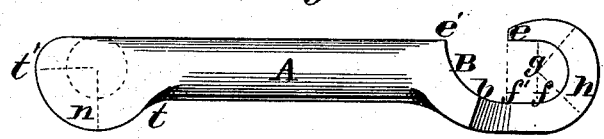
Figure 7:
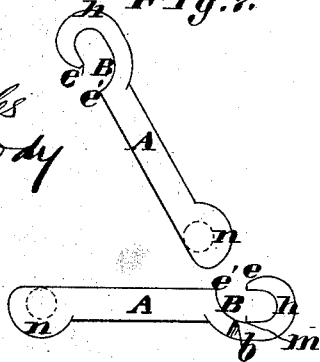

In the drawings, Figure 1 is a view, shown in perspective, of two links coupled together embodying the improvements embraced in my present invention. Fig. 2 is a plan of the same. Fig. 3 is an edge view. Figs. 4 and 5 are end views of opposite ends. Fig. 6 is an edge view of a single link, enlarged to double size of the other links, and is drawn to show the proportions of the link. Fig. 7 shows the mode of coupling the links together.

A and A' represent the two side rails of the link; C, the cross-bar; B, the base of the hook; $h$, the hook itself; $e$, the terminus of the hook that overreaches the cross-bar C when the two links are coupled together. $e'$ is the brink of the opening into the hook. $b$ and $b'$ are two shoulders, formed by the hook beginning to narrow down from its base. $n$ and $n'$ are two lugs, formed by the rounded ends of the two side rails, extended beyond the cross-bar C. The open space between $e$ and $e'$ constitutes the passage-way to the interior of the hook $h$, and is just large enough to receive the cross-bar C when coupling the links together, the distance from $e$ to $e'$ being just equal to the diameter of the cross-bar, which is cylindrical in form. The side rails, A and A', are also cylindrical in form, except slightly flattened at each end, as shown in Fig. 1.

The hook $h$ is of peculiar form and construction, it being on the inner side elongated, as shown in Fig. 6. The center of the hook being at $g$, the hook is described with $g$ to $f$ as a radius, and the extremity of the hook at $e$ reaches over far enough to entirely cover the cross-bar C.

When the links are coupled together, Fig. 3, the ends of the lugs $n$ and $n'$ impinge upon the shoulders $b$ and $b'$, respectively, and prevents the cross-bar from backing up in the hook far enough to become disengaged. In order to uncouple the links, Fig. 3, take the free end of the right-hand link and carry it upward and over to the left to the relative position, as shown in Fig. 7, and then draw it endwise, so that the cross-bar may leave the cavity of the hook $h$ and become entirely disengaged therefrom. In coupling again, the links have only to be brought to the same relative position, when they may be again brought together and carried over to a straight line, as before. The cross-bar C is flush with the side rail, their centers being in the same plane; but the lugs $n$ and $n'$, beginning at the top, extend below the cross-bar, and their extreme outer limits are circular in form from $t$ to $t'$, Fig. 6, being described by a radius from the center of the cross-bar. The transverse section of the lugs is of irregular shape, as seen in Fig. 4. It is this peculiar shape and position of the lugs that enables me to couple and uncouple the links when they are placed in the position shown in Fig. 7. In coupling them together I place the links in the position shown in Fig. 7, carry the cross-bar down into the interior of the hook until it reaches the bottom at $m$. Then the lower face of the lugs $n$ and $n'$ rests against the shoulders $b$ and $b'$. In carrying the free end of the link over toward the position required when in use the lugs act as levers against the shoulders, and the latter act as fulcrums, and as the link is continually carried toward a line with the first link the cross-bar C is forced outward against the hook and entirely buried under the overlapping end $e$ of the hook. This operation forces the cross-bar about two-thirds its diameter forward, and sustains it there while in use. In this position it is impossible for the links to ever become accidentally uncoupled when in use, no matter how much the chain may be worn.

It will readily be seen that in this improvement there is no place in the link that (from the nature of the invention) is required to be cut away or weakened in order to couple the links together, as there is in some of the other inventions patented in this line; but, on the other hand, my link is re-enforced with strength just at the weak and usually breaking point of other chains—namely, at $t$, Fig. 3—and this is a very valuable feature of my link.

In practicing my invention I conceive that it is not absolutely necessary to employ both lugs $n$ and $n'$ and their respective shoulders $b$ and $b'$, as the use of a lug and shoulder on one side of the link will as effectually prevent the links from becoming uncoupled when in use, and it is only from preference that I use them on both sides of the link.

Having thus sufficiently described my invention, what I claim as new is—

A link for drive-chains formed with longitudinal bars A A', cams $n$ $n'$, in line therewith and convex on their inner faces, the cross-bar C, between said cams, the hook-base B, having a single central broad hook, $h$, provided with extension $e$, and shoulders $b$ $b'$, curved outwardly from the hook, the said hook being adapted to engage the cross-bar C between the longitudinal bars A A', and the said cam-faces being adapted to play on the curved shoulders to slide the cross-bar on the shank into place under the hook, so as to be covered by the hook-extension, as set forth.

NELSON B. FASSETT.

Witnesses:
 A. GRASSLEY,
 SAML. KNIGHT.